(12) United States Patent
Kim et al.

(10) Patent No.: US 9,726,343 B2
(45) Date of Patent: Aug. 8, 2017

(54) LENS AND LIGHTING APPARATUS INCLUDING THE SAME

(71) Applicant: LG INNOTEK CO., LTD., Seoul (KR)

(72) Inventors: Eun Hwa Kim, Seoul (KR); Ki Hyun Kim, Seoul (KR); Sung Ku Kang, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 37 days.

(21) Appl. No.: 14/590,347

(22) Filed: Jan. 6, 2015

(65) Prior Publication Data
US 2015/0204508 A1  Jul. 23, 2015

(30) Foreign Application Priority Data

Jan. 7, 2014 (KR) ................. 10-2014-0001852
Jan. 24, 2014 (KR) ................. 10-2014-0009071

(51) Int. Cl.
| F21V 3/00 | (2015.01) |
| F21V 5/00 | (2015.01) |
| F21V 5/04 | (2006.01) |
| F21V 5/08 | (2006.01) |
| G02B 3/00 | (2006.01) |
| F21Y 115/10 | (2016.01) |

(52) U.S. Cl.
CPC ............ *F21V 5/04* (2013.01); *F21V 5/08* (2013.01); *G02B 3/00* (2013.01); *F21Y 2115/10* (2016.08)

(58) Field of Classification Search
CPC ......... F21V 5/04; F21V 5/08; F21Y 2101/02; G02B 3/00; G02B 2003/0093; G02B 19/0061; G02B 19/0071

USPC .................................................. 362/311.06
See application file for complete search history.

(56) References Cited

U.S. PATENT DOCUMENTS

| 8,545,058 B2 * | 10/2013 | Chen .................... F21V 5/04 362/268 |
| 9,404,635 B2 * | 8/2016 | Kelley .................. F21V 5/002 |
| 2010/0110684 A1 * | 5/2010 | Abdelsamed ......... F21V 17/164 362/249.02 |

(Continued)

FOREIGN PATENT DOCUMENTS

| CN | 102588878 A | 7/2012 |
| DE | 10 2013 106 158 A1 | 12/2013 |

(Continued)

OTHER PUBLICATIONS

European Search Report dated May 27, 2015 issued in Application No. 15150369.5.

*Primary Examiner* — Renee Chavez
*Assistant Examiner* — Erin Kryukova
(74) *Attorney, Agent, or Firm* — KED & Associates, LLP

(57) ABSTRACT

A lighting apparatus includes a body, a light source unit disposed on the body to generate light, and a lens disposed on the body to refract light generated from the light source unit. The lens includes a light introduction portion having a light introduction surface for introduction of light and a light emission portion having a light emission surface for passage of light having passed through the light introduction portion, and the light introduction surface of the light introduction portion and the light emission surface of the light emission portion are configured to satisfy cos a1−cos θ1/cos a2−cos θ2<0.

14 Claims, 13 Drawing Sheets

(56) References Cited

U.S. PATENT DOCUMENTS

| | | | |
|---|---|---|---|
| 2010/0165640 A1* | 7/2010 | Lin | F21V 5/04 362/336 |
| 2011/0019425 A1* | 1/2011 | Chen | F21V 5/04 362/311.02 |
| 2011/0164425 A1* | 7/2011 | Chen | F21V 5/04 362/311.06 |
| 2011/0235338 A1 | 9/2011 | Chen et al. | |
| 2011/0279751 A1* | 11/2011 | Iiyama | F21V 5/04 349/64 |
| 2011/0317413 A1* | 12/2011 | Lee | F21V 5/04 362/235 |
| 2012/0051047 A1* | 3/2012 | Lu | G02B 19/0066 362/235 |
| 2012/0268946 A1* | 10/2012 | Chen | F21V 5/04 362/311.09 |
| 2013/0051030 A1* | 2/2013 | Lee | F21V 5/04 362/311.02 |
| 2014/0126218 A1* | 5/2014 | Lin | F21V 5/08 362/311.02 |
| 2014/0126222 A1* | 5/2014 | Wang | F21V 5/046 362/311.09 |

FOREIGN PATENT DOCUMENTS

| | | |
|---|---|---|
| EP | 2 402 646 A2 | 1/2012 |
| JP | 2013-73847 A | 4/2013 |
| KR | 10-1286705 B1 | 7/2013 |

* cited by examiner

| | Lens Name | case1 | case2 | case3 | case4 | case5 | case6 | case7 |
|---|---|---|---|---|---|---|---|---|
| | IESNA Classfication | Type II | Type II | Type II | Type III | Type III | Type IV | Type VS |
| Luminous Flux Ratio | S/H | 1.0 | 2.0 | 2.0 | 2.0 | 2.5 | 2.2 | 1.0 |
| Lens Size Ratio | RF2/RB2 | 1.0 | 1.4 | 1.2 | 1.5 | 1.6 | 2.2 | 1.0 |
| | RF1/RB1 | 1.0 | 1.0 | 0.8 | 1.0 | 0.9 | 0.7 | 1.0 |

LENS AND LIGHTING APPARATUS INCLUDING THE SAME

CROSS REFERENCE TO RELATED APPLICATIONS

This application claims priority under 35 U.S.C. §119 to Korean Patent Application No. 10-2014-0009071, filed on Jan. 24, 2014 and No 10-2014-0001852, filed on Jan. 7, 2014, whose entire disclosures are incorporated herein by reference.

BACKGROUND

1. Field

Embodiments relate to lenses for illuminators and lighting apparatuses including the same.

2. Background

Outdoor luminaires, such as street luminaires, may provide a pleasant and convenient environment to ensure safe activity of people on streets at night and may remove anxiety and reduce fatigue of vehicle drivers. Street luminaires may be divided into street luminaires, security luminaires, and walking assistance luminaires, according to streets where the luminaires are installed.

Light sources of these street luminaires may be selected from among sodium lamps, mercury lamps, or metal halide lamps. In recent years, light emitting diodes (LEDs) that have low power consumption and extended lifespan and do not cause environmental pollution are in the spotlight as light sources of street luminaires. Outdoor lighting apparatuses using LEDs include lenses to collect light emitted from LEDs. There is a need for lens design to achieve light distribution suitable for a variety of environments.

BRIEF DESCRIPTION OF THE DRAWINGS

The embodiments will be described in detail with reference to the following drawings in which like reference numerals refer to like elements wherein.

DETAILED DESCRIPTION

Figure 1:
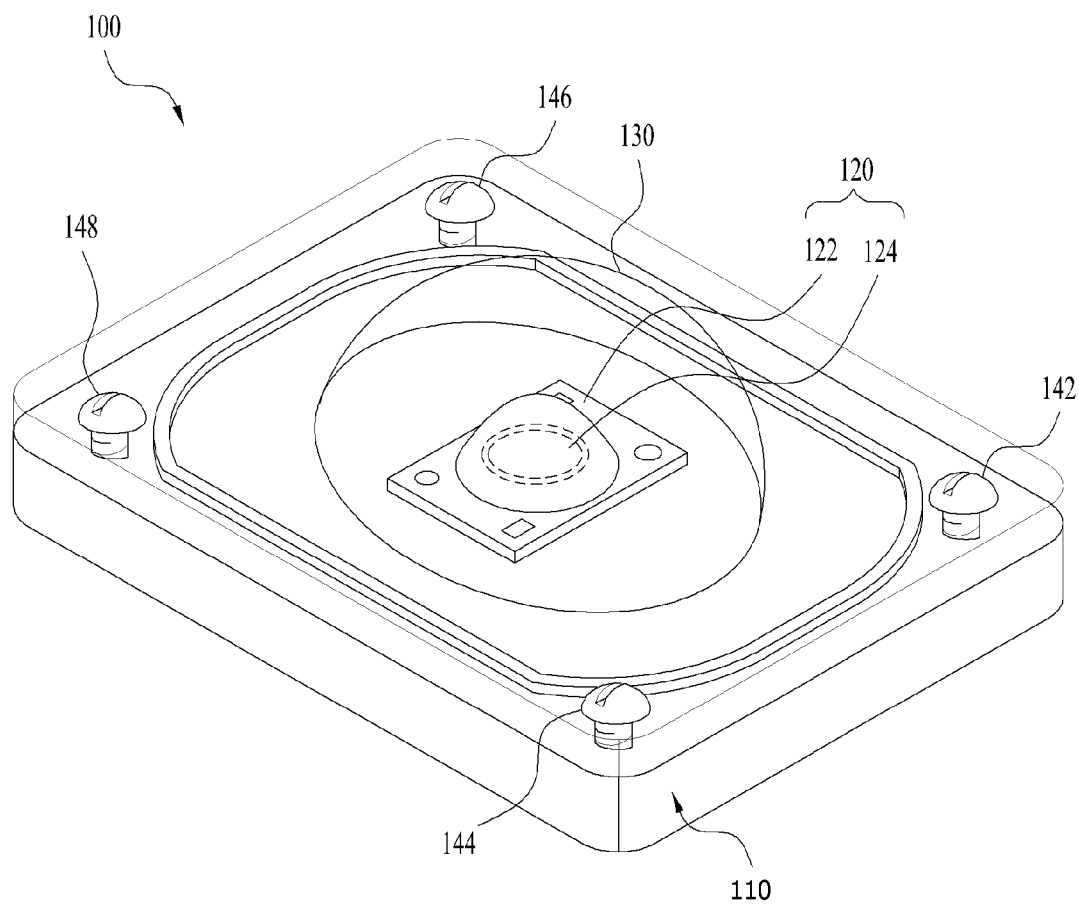
FIG. 1 is a perspective view of a lighting apparatus according to an embodiment.

It will be understood that, when an element such as a layer (film), region, pattern, or structure is referred to as being "on" or "under" another element, it can be "directly" on or under another element or can be "indirectly" formed such that an intervening element may also be present. In addition, it will also be understood that criteria of on or under is on the basis of the drawing.

Figure 2:
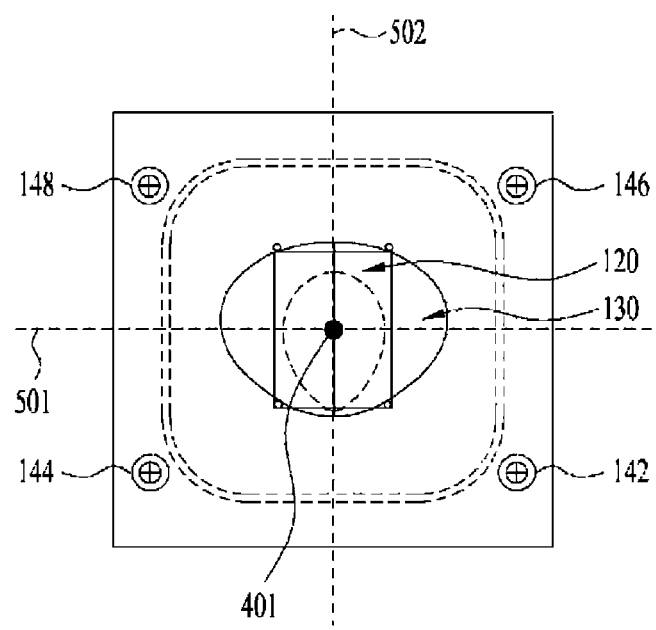
FIG. 2 is a plan view of the lighting apparatus shown in FIG. 1.
Figure 3:
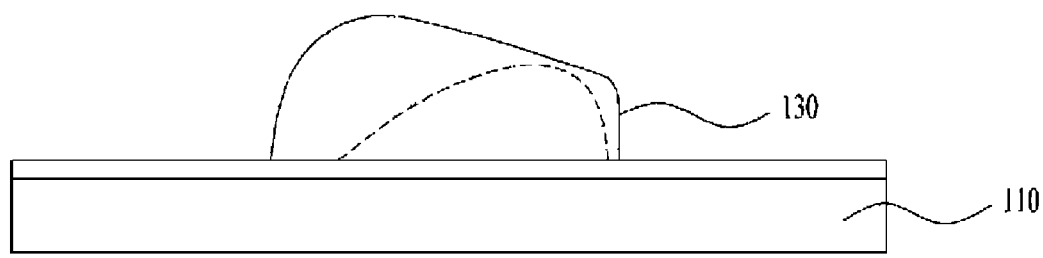
FIG. 3 is a sectional view of the lighting apparatus shown in FIG. 1.

FIG. 1 is a perspective view of a lighting apparatus 100 according to an embodiment, FIG. 2 is a plan view of the lighting apparatus 100 shown in FIG. 1, and FIG. 3 is a sectional view of the lighting apparatus 100 shown in FIG. 1. The lighting apparatus 100 includes a body 110, a light source unit 120, and a lens 130.

The body 110 is configured to support the light source unit 120 and the lens 130. For example, the body 110 may be a package body, without being limited thereto. The body 110 may be formed as a board having good electric insulation or thermal conductivity, such as a silicon based wafer level package, silicon board, silicon carbide (SiC) board, or aluminum nitride (AlN) board, or may be formed of a resin material, such as polyphthalamide (PPA). In addition, the body 110 may be a stack of multiple boards.

The light source unit 120 is disposed on the body 110 to generate light. The light source unit 120 may include a board and light emitting elements. The light emitting elements may be, for example, light emitting diodes (LEDs). The number of the light emitting elements may be 1 or more, without being limited thereto. The lens 130 is disposed on the body 110 to refract light generated from the light source unit 120. The lens 130 may be formed of a light transmitting resin material or glass material.

Figure 4:
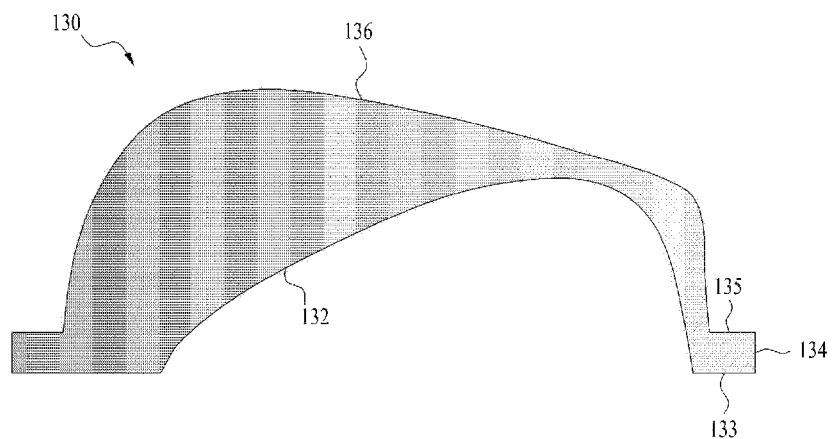
FIG. 4 is a sectional view of a lens shown in FIG. 1.

FIG. 4 is a sectional view of the lens 130 shown in FIG. 1. The lens 130 may include a light introduction portion 132, into which light is introduced, and a light emission portion 136, through which light having passed through the light introduction portion 132 passes.

The lens 130 may further include a lower surface portion 133 located around the light introduction portion 132 to come into contact with the light introduction portion 132, an upper surface portion 135 located around the light emission portion 136 to come into contact with the light emission portion 136, and a side portion 134 located between the upper surface portion 135 and the lower surface portion 133. The side portion 134 may include side surfaces facing different directions.

A space may be defined between the light source unit 120 and a light introduction surface of the light introduction portion 132. The space may be filled with air or may be vacuum, without being limited thereto. A material having a given index of refraction may fill the space between the light source unit 120 and the light introduction surface of the light introduction portion 132. The light introduction portion 132 may be oriented to face the light source unit 120 and the light introduction surface of the light introduction portion 132 may be a convexly curved surface into which light is introduced.

The light emission portion 136 may be located above the light introduction portion 132 and have a light emission surface that is a convexly curved surface, through which light having passed through the light introduction portion 132 passes. The light emission portion 136 may take the form of a convex dome, and the light emission surface of the light emission portion 136 and the light introduction surface of the light introduction portion 132 may have different curvatures.

The light source unit 120 may be located at the center of the lens 130, although the embodiment is not limited thereto. For example, the center of a light emitting surface of the light source unit 120 may be aligned with the center of the lens 130. Light may be refracted, according to the curvatures of the light introduction surface of the light introduction portion 132 and the light emission surface of the light emission portion 136 when passing through the respective surfaces. The lower surface portion 133 of the lens 130 may be oriented to face an upper surface of the body 110. For example, the lower surface portion 133 of the lens 130 may come into contact with the upper surface of the body 110, without being limited thereto.

Light generated from the light source unit 120 may be primarily refracted at the light introduction portion 132 and secondarily refracted at the light emission portion 136. A light distribution pattern of the lens 130 may be determined according to respective refraction angles of the light introduction portion 132 and the light emission portion 136. The refraction angle of the light introduction portion 132 may be determined according to the curvature of the light introduction surface, and the refraction angle of the light emission portion 136 may be determined according to the curvature of the light emission surface.

Figure 5:
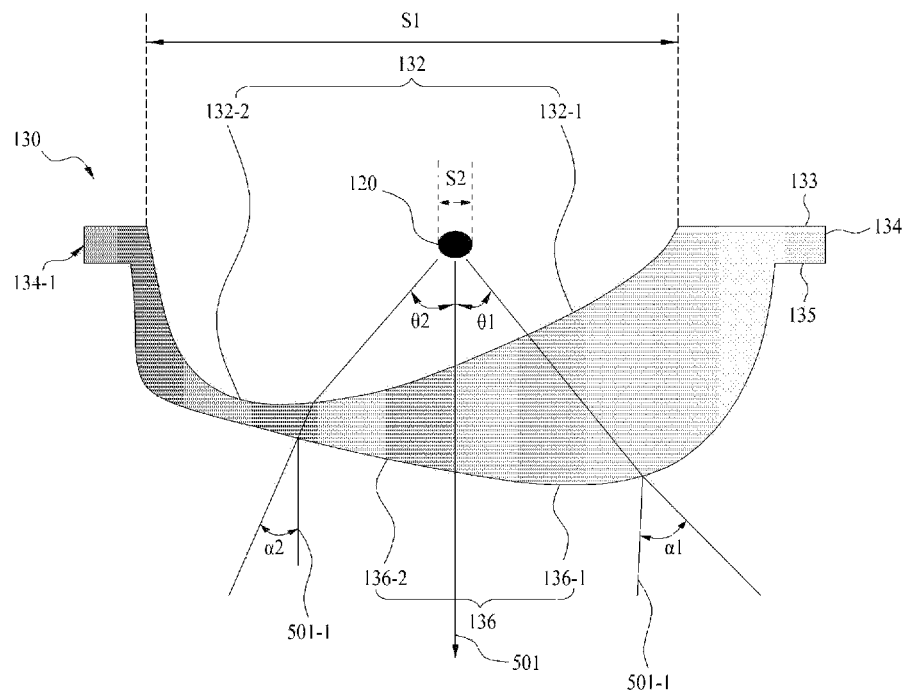
FIG. 5 is a view showing a refraction angle of the lens according to an embodiment.

FIG. 5 is a view showing a refraction angle of the lens according to an embodiment. Light generated from the light source unit 120 may pass through the light introduction portion 132, and the light having passed through the light introduction portion 132 may be primarily refracted. The primarily refracted light may pass through the light emission portion 136, and the light having passed through the light emission portion 136 may be secondarily refracted.

Shapes of the light introduction portion 132 and the light emission portion 136 of the lens 130 may be determined based on an angle at which light generated from the light source unit 120 is introduced into the light introduction portion 132 (e.g., $\theta 1$ and $\theta 2$) (hereinafter referred to as "introduction angle") and an angle at which light is emitted from the light emission portion 136 (e.g., $\alpha 1$ and $\alpha 2$) (hereinafter referred to as "emission angle").

The introduction angle of the light introduction portion 132 (e.g., $\theta 1$ and $\theta 2$) and the emission angle of the light emission portion 136 (e.g., $\alpha 1$ and $\alpha 2$) may be tilt angles on the basis of a reference plane 501. For example, the reference plane 501 may be perpendicular to the lower surface portion 133 of the lens 130 and also be perpendicular to a bilateral symmetrical plane 502 that divides the lens 130 into left and right symmetrical parts. The lens 30 may be asymmetrical on the basis of the reference plane 501. In addition, the reference plane 501 may be a plane that divides a light distribution pattern of the lens 130 into a street side and a house side.

For example, the reference plane 501 may be a plane that divides a light distribution pattern of an outdoor luminaire into a street side and a house side. In another example, the reference plane 501 may pass through the center of the lens 130 and be parallel to any one side surface 134-1 of the lens 130. In further example, the reference plane 501 may pass through the center of the light emitting surface of the light source unit 120 and be parallel to any one side surface 134-1 of the lens 130. In another example, the reference plane 501 may pass through the center of a lower end of the light introduction portion 132 of the lens 130 and be perpendicular to the lower surface portion 133 of the lens 130.

The light introduction portion 132 may include a first introduction portion 132-1 located at one side of the reference plane 501 and a second introduction portion 132-2 located at the other side of the reference plane 501. The light emission portion 136 may include a first emission portion 136-1 located at one side of the reference plane 501 and a second emission portion 136-2 located at the other side of the reference plane 501.

For example, the first introduction portion 132-1 and the first emission portion 136-1 may be located at a street side on the basis of the reference plane 501, and the second introduction portion 132-2 and the second emission portion 136-2 may be located at a house side on the basis of the reference plane 501.

The light introduction surface of the light introduction portion 132 and the light emission surface of the light emission portion 136 may be configured such that a value acquired by dividing $\cos \alpha 1 - \cos \theta 1$ by $\cos \alpha 2 - \cos \theta 2$ is below zero.

A first introduction angle (e.g., $\theta 1$) may be an angle of light introduced into one region of the light introduction portion 132 located at one side of the reference plane 501, and a second introduction angle (e.g., $\theta 2$) may be an angle of light introduced into the other region of the light introduction portion 132 located at the other side of the reference plane 501. A first emission angle (e.g., $\alpha 1$) may be an angle of light, having the first introduction angle (e.g., $\theta 1$), emitted from the light emission portion 136, and a second emission angle (e.g., $\alpha 2$) may be an angle of light, having the second introduction angle (e.g., $\theta 2$), emitted from the light emission portion 136.

The light introduction surface of the light introduction portion 132 and the light emission surface of the light emission portion 136 may be configured to satisfy the following Equation 1.

$$\cos a1 - \cos \theta 1 / \cos a2 - \cos \theta 2 < 0 \qquad \text{Equation 1}$$

The angles $\theta 1$ and $\alpha 1$ may be respectively an introduction angle and an emission angle of light passing through the first introduction portion 132-1 and the first emission portion 136-1, and the angles $\theta 2$ and $\alpha 2$ may be respectively an introduction angle and an emission angle of light passing through the second introduction portion 132-2 and the second emission portion 136-2.

The first and second introduction angles (e.g., $\theta 1$ and $\theta 2$) and the first and second emission angles (e.g., $\alpha 1$ and $\alpha 2$) may be introduction angles and emission angles of light having a luminous intensity corresponding to 80% of the maximum luminous intensity of light generated from the light source unit 120. Light having a luminous intensity corresponding to 80% of the maximum luminous intensity is luminous flux that can determine directivity or quality of light.

A value (e.g., $\cos \alpha 1 - \cos \theta 1$) acquired by subtracting a cosine value $\cos \theta 1$ of the first introduction angle $\theta 1$ from a cosine value $\cos \alpha 1$ of the first emission angle $\alpha 1$, and a value (e.g., $\cos \alpha 2 - \cos \theta 2$) acquired by subtracting a cosine value cos θ2 of the second introduction angle θ2 from a cosine value cos α2 of the second emission angle α2 may be values having different polarities.

For example, a value cos α1−cos θ1 acquired by subtracting a cosine value cos θ1 of the first introduction angle θ1 from a cosine value cos α1 of the first emission angle α1 may be a positive value, and a value cos α2−cos θ2 acquired by subtracting a cosine value cos θ2 of the second introduction angle θ2 from a cosine value cos α2 of the second emission angle α2 may be a negative value.

Alternatively, a value cos α1−cos θ1 acquired by subtracting a cosine value cos θ1 of the first introduction angle θ1 from a cosine value cos α1 of the first emission angle α1 may be a negative value, and a value cos α2−cos θ2 acquired by subtracting a cosine value cos θ2 of the second introduction angle θ2 from a cosine value cos α2 of the second emission angle α2 may be a positive value.

A tilt angle toward one side (e.g., the right side) from the reference plane 501 or a plane 501-1 parallel to the reference plane may have a negative value, and a tilt angle toward the other side (e.g., the left side) may have a positive value. θ1, θ2, α1, and α2 may respectively be within a range of −90° to 90°.

The first introduction angle θ1 may have a negative value, and the second introduction angle θ2 may have a positive value (θ1<0 and θ2>0). In one example, in a case of θ1<0 and θ2>0, the second emission angle α2 may be less than the second introduction angle θ2 (α2<θ2), and the first emission angle α1 may be less than the first introduction angle θ1 (α2<θ1). In another example, in a case of θ1<0 and θ2>0, the second emission angle α2 may be below zero, and the first emission angle α1 may be greater than the second emission angle α2 (α2<0 and α1>α2). In addition, the second emission angle α2 may be less than the second introduction angle θ2 (α2<θ2), and the first emission angle α1 may be less than the first introduction angle θ1 (α1<θ1).

The first introduction angle θ1 may have a positive value, and the second introduction angle θ2 may have a negative value (θ1>0 and θ2<0). In one example, in a case of θ1>0 and θ2<0, the second emission angle α2 may be greater than the second introduction angle θ2 (α2>θ2), and the first emission angle α1 may be greater than the first introduction angle θ1 (α1>θ1). In another example, in a case of θ1>0 and θ2<0, the second emission angle α2 may be above zero, and the first emission angle α1 may be less than the second emission angle α2 (α2>0 and α1<α2). In addition, the second emission angle α2 may be greater than the second introduction angle θ2 (α2>θ2), and the first emission angle α1 may be greater than the first introduction angle θ1 (α1>θ1).

The light source unit 120 may have a size equal to or less than a size of the light introduction portion 132. For example, a diameter S2 of the light source unit 120 may be equal to or less than a diameter S1 of the lower end of the light introduction portion 132. For example, the maximum diameter S2 of a light emitting area of the light source unit 120 may be equal to or less than the minimum diameter S1 of the lower end of the light introduction portion 132. While a light distribution pattern may vary according to a diameter of the light emitting area of the light source unit 120, relationships between the first and second introduction angles θ1 and θ2 and the first and second emission angles E1 and α2 may be identical or similar to the above description.

Figure 8:
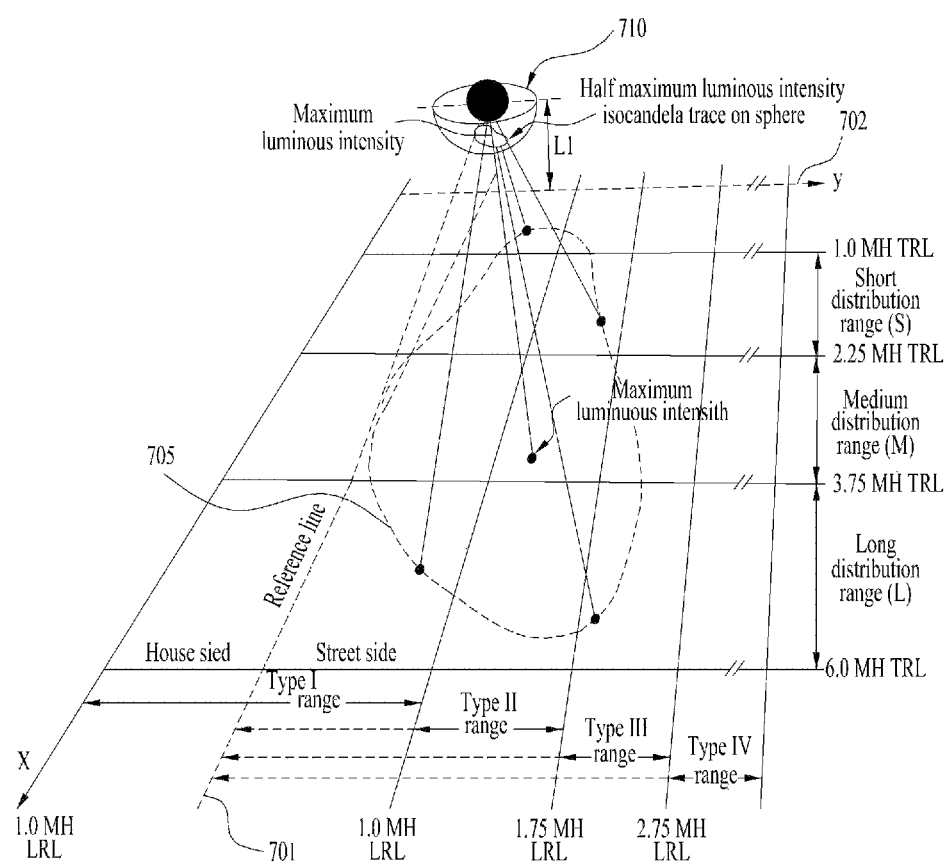
FIG. 8 is a view showing a light distribution pattern of a street lighting apparatus based on distance.

FIG. 8 is a view showing a light distribution pattern of a street lighting apparatus 710 based on distance.

A light distribution pattern of the street lighting apparatus 710 may be divided into a street side and a house side on the basis of a first reference line 701. The first reference line 701 may be a line parallel to the X-axis, on which the street lighting apparatus 710 is located. For example, the first reference line 701 may be a line on the reference plane 501 shown in FIG. 5.

X-axis and Y-axis coordinates may be denoted by multiples of a vertical distance L1 of the lighting apparatus 710. For example, "1.0 MH TRL" may mean that a distance from the first reference line 701 is one multiple of the vertical distance L1. In addition, "1.0 MH TRL" may mean that a distance from a second reference line 702 is one multiple of the vertical distance L1.

A region 705 delimited by a dotted line denotes a light distribution region having a luminous intensity corresponding to 50% or more of the maximum luminous intensity of light emitted from the lighting apparatus 710. Light distribution patterns of the lighting apparatus 710 may be divided into a first type to a fourth type according to a position of the light distribution region 705.

Figure 6A:
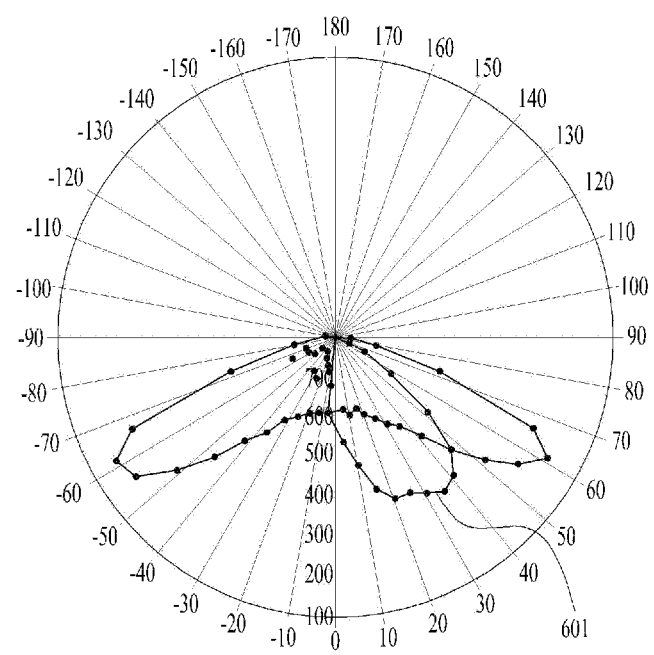
FIG. 6A is a view showing a first embodiment of a light distribution pattern of the lighting apparatus shown in FIG. 1.
Figure 6B:
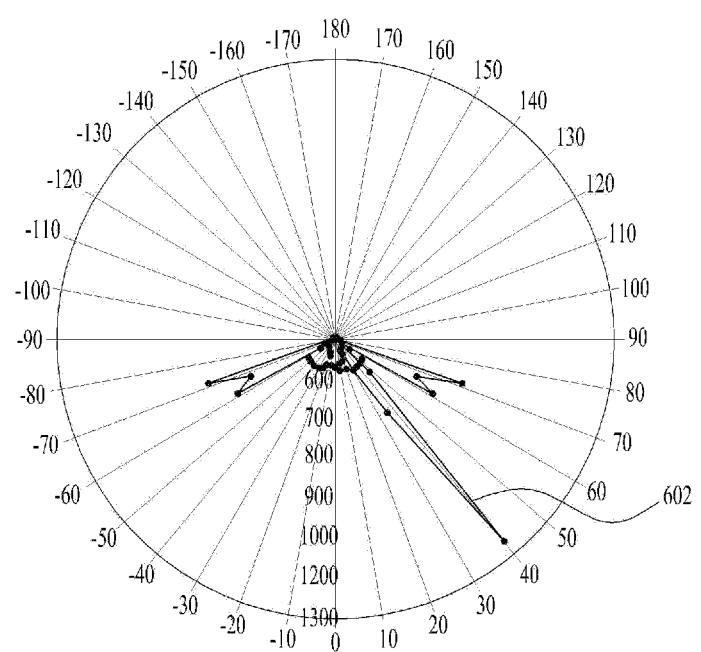
FIG. 6B is a view showing a second embodiment of a light distribution pattern of the lighting apparatus shown in FIG. 1.

FIG. 6A is a view showing a first embodiment of a light distribution pattern of the lighting apparatus 100 shown in FIG. 1, and FIG. 6B is a view showing a second embodiment of a light distribution pattern of the lighting apparatus 100 shown in FIG. 1. A diameter of the light source unit 120 in FIG. 6A may be greater than a diameter of the light source unit 120 in FIG. 6B. For example, a diameter of the light source unit 120 in FIG. 6A may be 14 mm and a diameter of the light source unit 120 in FIG. 6B may be 1 mm. Referring to FIGS. 6A and 6B, it will be appreciated, upon referring to light distribution patterns 601 and 602 to a street side and a house side on the basis of the reference plane 501, that the lighting apparatus 100 has a second type light distribution pattern.

Figure 7A:
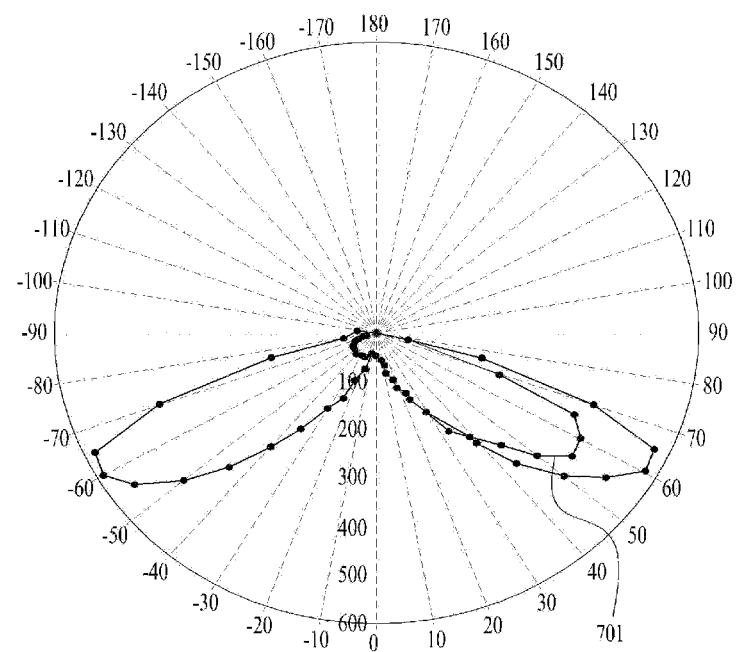
FIG. 7A is a view showing a third embodiment of a light distribution pattern of the lighting apparatus shown in FIG. 1.
Figure 7B:
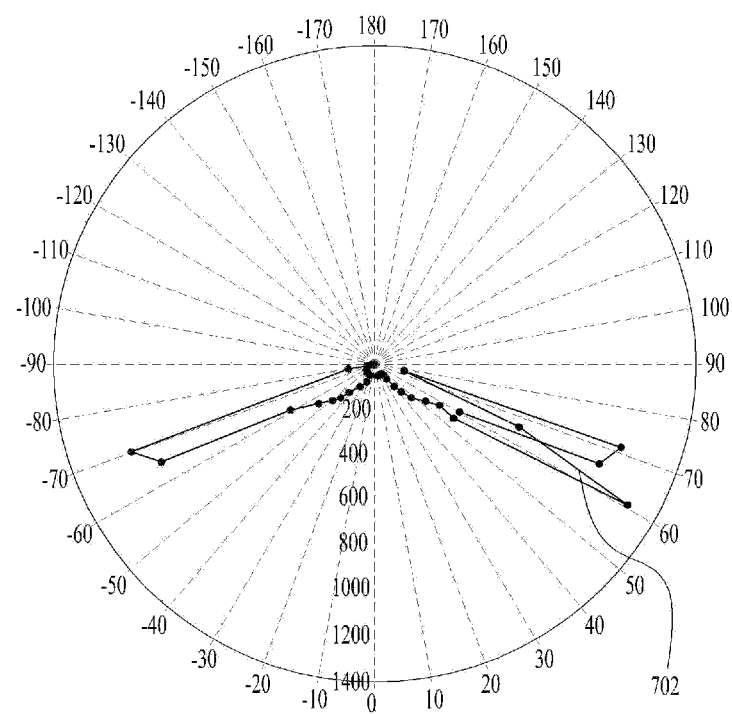
FIG. 7B is a view showing a fourth embodiment of a light distribution pattern of the lighting apparatus shown in FIG. 1.

FIG. 7A is a view showing a third embodiment of a light distribution pattern of the lighting apparatus 100 shown in FIG. 1, and FIG. 7B is a view showing a fourth embodiment of a light distribution pattern of the lighting apparatus 100 shown in FIG. 1. A diameter of the light source unit 120 in FIG. 7A may be greater than a diameter of the light source unit 120 in FIG. 7B. For example, a diameter of the light source unit 120 in FIG. 7A may be 14 mm and a diameter of the light source unit 120 in FIG. 7B may be 1 mm. Referring to FIGS. 7A and 7B, it will be appreciated, upon referring to light distribution patterns 701 and 702 to a street side and a house side on the basis of the reference plane 501, that the lighting apparatus 100 has a third type light distribution pattern.

The embodiments may realize a light distribution pattern to allow a greater proportion of light to be directed to a street side rather than a house side by determining relationships between the first introduction angle, the second introduction angle, the first emission angle, and the second emission angle as represented by Equation 1. The embodiments may realize at least second type light distribution pattern having directivity to a street side in FIG. 8.

Figure 9:
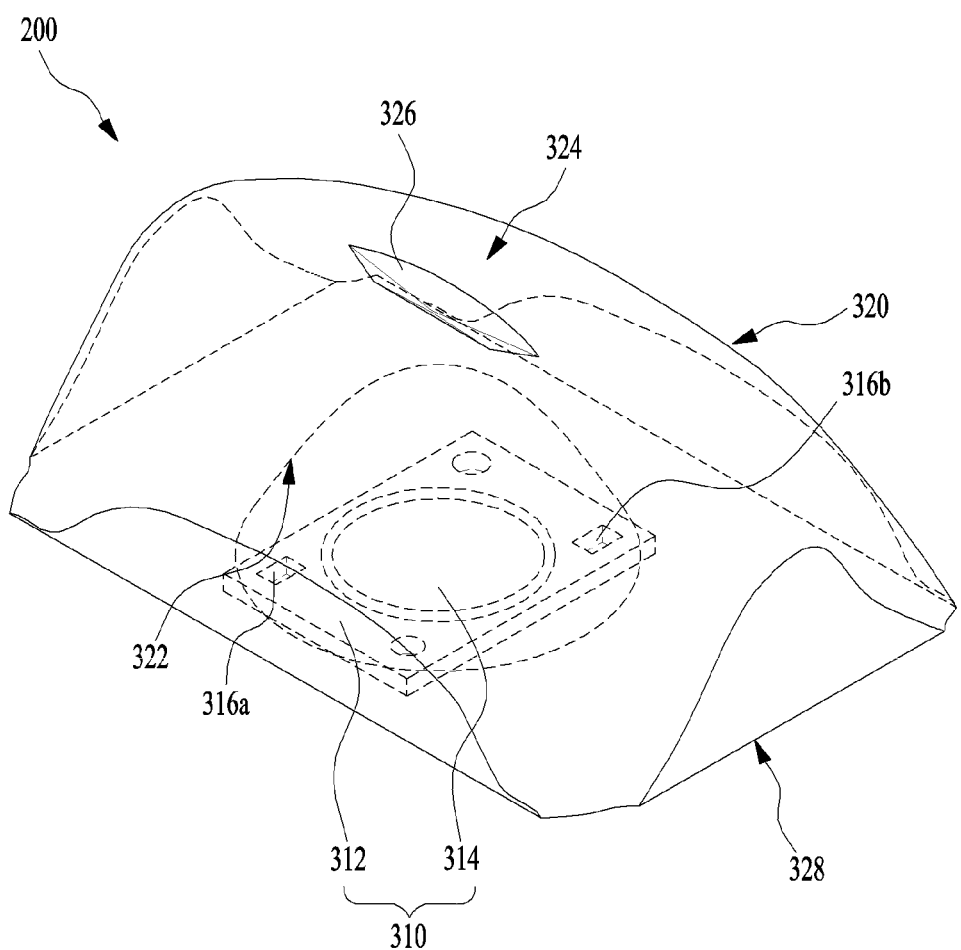
FIG. 9 is a perspective view of a lighting apparatus according to another embodiment.
Figure 10:
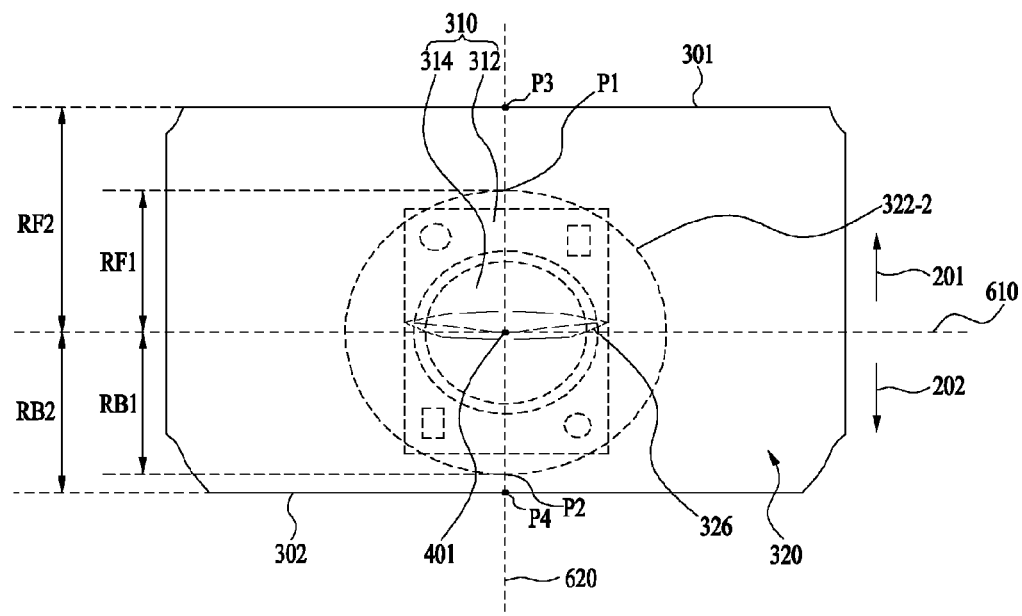
FIG. 10 is a plan view of the lighting apparatus shown in FIG. 9.
Figure 11:
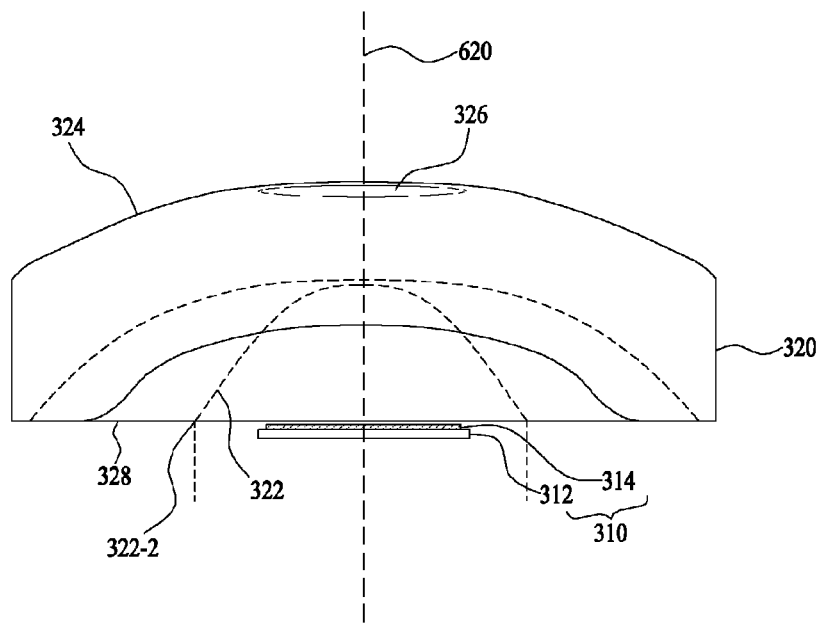
FIG. 11 is a front view of the lighting apparatus shown in FIG. 9.
Figures 12, 13:
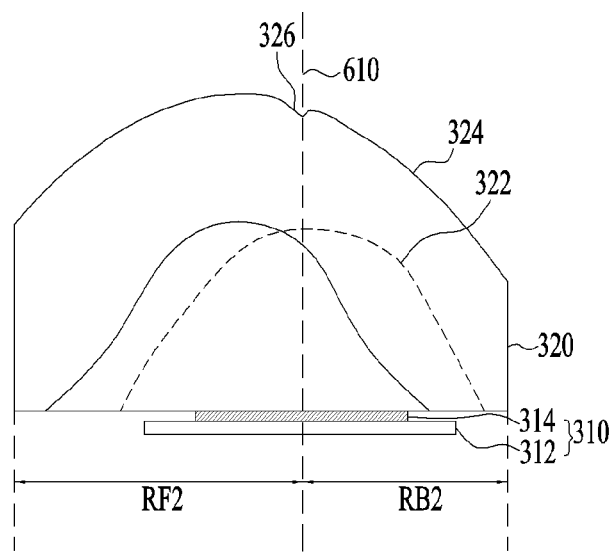
FIG. 12 is a side view of the lighting apparatus shown in FIG. 9.
FIG. 13 is a view showing luminous flux ratios of lenses having different shapes and sizes.

FIG. 9 is a perspective view of a lighting apparatus 200 according to another embodiment, FIG. 10 is a plan view of the lighting apparatus 200 shown in FIG. 9, FIG. 11 is a front view of the lighting apparatus 200 shown in FIG. 9, and FIG. 12 is a side view of the lighting apparatus 200 shown in FIG. 9. The lighting apparatus 200 includes a light source unit 310 to generate light and a lens 320 to refract light.

The light source unit 310 generates light. The light source unit 310 may include a board 312 and at least one light emitting element 314. The board 312 may be a printed circuit board, without being limited thereto. The board 312 may be provided with a first electrode part 316a to which first power is supplied and a second electrode part 316b to which second power is supplied. The light emitting element 314 may be an LED, without being limited thereto. The number of the light emitting element 314 may be 1 or more. The light emitting element 314 may be electrically connected to the first electrode part 316a and the second electrode part 316b.

The lens 320 may be disposed on the light source unit 310 to refract light generated from the light source unit 310. The lens 320 may be formed of a light transmitting resin material or glass material. The lens 320 may include a light introduction surface 322 into which light is introduced and a light emission surface 324 from which light having passed through the light introduction surface 322 is emitted outward.

A space may be defined between the light source unit 310 and the light introduction surface 322. The space may be filled with air or be vacuum, without being limited thereto. In another embodiment, the space between the light source unit 310 and the light introduction surface 322 may be filled with a material having a given index of refraction.

The light introduction surface 322 may be oriented to face the light source unit 310 and be a convexly curved surface into which light is introduced. The light emission surface 324 may be located above the light introduction surface 322 and be a convexly curved surface through which light having passed through the light introduction surface 322 passes. The light emission surface 324 may take the form of a convex dome, and the light emission surface 324 and the light introduction surface 322 may have different curvatures. The light introduction surface 322 and the light emission surface 324 may have different refraction angles.

The refraction angle of the light introduction surface 322 may mean an angle at which light introduced into the light introduction surface 322 is refracted after passing through the light introduction surface 322. In addition, the refraction angle of the light emission surface 324 may mean an angle at which light introduced into the light emission surface 324 is refracted after passing through the light emission surface 324.

The light emission surface 324 may have a recess 326 for deformation. The recess 326 may vary a light refraction pattern of the light emission surface 324. For uniform light distribution, the recess 326 may be located in a first reference plane 610. For example, the recess 326 may be aligned with the center of a lower end of the light introduction surface 322 or the center of the light source unit 310.

The light source unit 310 may be located at the center of the lens 320, for example, at the center of the lower end of the light introduction surface 322 of the lens 320, although the embodiment is not limited thereto. For example, a light emitting surface of the light source unit 310, more particularly, a light emitting surface of the light emitting element 314 may be centrally aligned with the center of the lens 320, for uniform light distribution.

Light generated from the light source unit 310 may be refracted according to curvatures of the light introduction surface 322 and the light emission surface 324 when passing through the light introduction surface 322 and the light emission surface 324. The refraction angle of the light introduction surface 322 may be determined according to the curvature of the light introduction surface 322, and the refraction angle of the light emission surface 324 may be determined according to the curvature of the light emission surface 324.

For example, light emitted from the light source unit 310 may be primarily refracted at the light introduction surface 322 and secondarily refracted at the light emission surface 324. A light distribution pattern of the lens 320 may be determined according to the refraction angles of the light introduction surface 322 and the light emission surface 324.

The lens 320 may further include a lower surface 328 located around the light introduction surface 322 to come into contact with a lowermost end of the light introduction surface 322, the lower surface 328 being located between the light introduction surface 322 and the light emission surface 324. The lower surface 328 of the lens 320 may be a flat surface, without being limited thereto.

The lens 320 may be asymmetrical on the basis of a first reference plane 610. In addition, the lens 320 may be symmetrical on the basis of a second reference plane 620. The first reference plane 610 may be perpendicular to a plane in which the light source unit 310 is oriented and pass through a center 401 of the light source unit 310. For example, assuming that a protruding direction of the light introduction surface 322 and the light emission surface 324 of the lens 320 is a first direction (e.g., the Z-axis), the first reference plane 610 may be perpendicular to a plane (e.g., the XY plane) that is perpendicular to the first direction (e.g., the Z-axis).

For example, the first reference plane 610 may be a plane that is perpendicular to the lower surface 328 of the lens 320 and passes through the center 401 of the light introduction surface 322. For example, the first reference plane 610 may be a plane that is perpendicular to the lower surface 328 of the lens 320 and passes through the center of the lower end of the light introduction surface 322.

A light distribution pattern of the street lighting apparatus may be divided into a street side and a house side on the basis of the first reference plane 610. For example, in FIG. 10, an upward direction of the first reference plane 610 may be a street side 201 and a downward direction of the first reference plane 610 may be a house side 202.

The second reference plane 620 may pass through the center 401 of the light source unit 310 and be perpendicular to the first reference plane 610. In one example, the second reference plane 620 may pass through the center 401 of the light introduction surface 322 and be perpendicular to the first reference plane 610. In another example, the second reference plane 620 may pass through the center 401 of the lower end of the light introduction surface 322 and be perpendicular to the first reference plane 610.

A size of the light source unit 310 may be equal to or less than a size of the light introduction surface 322. For example, the maximum diameter of a light emitting area of the light source unit 310 may be equal to or less than the minimum diameter of the lower end of the light introduction surface 322.

A ratio RF1/RB1 of a first distance RF1 to a second distance RB1 with respect to the light introduction surface 322 may be less than 1. The first distance RF1 with respect to the light introduction surface 322 may be a distance (e.g., the maximum distance) between one end of the light introduction surface 322, which is located at one side of the first reference plane 610 or at a street side 201, and the first reference plane 610. The second distance RB1 with respect to the light introduction surface 322 may be a distance (e.g., the maximum distance) between the other end of the light introduction surface 322, which is located at the other side of the first reference plane 610 or at a house side 202, and the first reference plane 610.

One end of the light introduction surface 322 may be one end of a lowermost end 322-2 of the light introduction surface 322, and the other end of the light introduction surface 322 may be the other end of the lowermost end 322-2 of the light introduction surface 322. The lowermost end 322-2 of the light introduction surface 322 may be a boundary between the light introduction surface 322 and the lower surface 328.

For example, the first distance RF1 with respect to the light introduction surface 322 may be a distance between a first point P1 of the lower end of the light introduction surface 322, which is located at one side of the first reference plane 610 or at the street side 201, and the first reference plane 610. The first point P1 may be one point of the lowermost end 322-2 of the light introduction surface 322 that is located at one side of the first reference plane 610 or at the street side 201 and meets the second reference plane 620.

For example, the second distance RB1 with respect to the light introduction surface 322 may be a distance between a second point P2 of the lower end of the light introduction surface 322, which is located at the other side of the first reference plane 610 or at the house side 202, and the first reference plane 610. The second point P2 may be another point of the lowermost end 322-2 of the light introduction surface 322 that is located at the other side of the first reference plane 610 or at the house side 202 and meets the second reference plane 620.

A ratio of a first distance RF2 to a second distance RB2 with respect to the light emission surface 324 may be greater than 1 to less than 2.2. The first distance RF2 with respect to the light emission surface 324 may be a distance between one end 301 of the light emission surface 324, which is located at one side of the first reference plane 610 or at the street side 201, and the first reference plane 610. The second distance RB2 with respect to the light emission surface 324 may be a distance between the other end 302 of the light emission surface 324, which is located at the other side of the first reference plane 610 or at the house side 202, and the first reference plane 610.

One end 301 of the light emission surface 324 may be one end of a lowermost end of the light emission surface 324, and the other end 302 of the light emission surface 324 may be the other end of the lowermost end of the light emission surface 324. For example, the lowermost end of the light emission surface 324 may be a boundary between the light emission surface 324 and the lower surface 328.

For example, the first distance RF2 with respect to the light emission surface 324 may be a distance between a first point P3 of one end 301 of the light emission surface 324, which is located at one side of the first reference plane 610 or at the street side 201, and the first reference plane 610.

The first point P3 may be a point of one end 301 of the light emission surface 324 that is located at one side of the first reference plane 610 or at the street side 201 and meets the second reference plane 620. For example, the second distance RB2 with respect to the light emission surface 324 may be a distance between a second point P4 of the other end 302 of the light emission surface 324, which is located at the other side of the first reference plane 610 or at the house side 202, and the first reference plane 610. The second point P4 may be another point of the other end 302 of the light emission surface 324 that is located at the other side of the first reference plane 610 or at the house side 202 and meets the second reference plane 620.

FIG. 13 is a view showing luminous flux ratios of lenses having different shapes and sizes. Lenses in first to seventh cases (case 1 to case 7) may have different shapes and sizes. For example, in the first to seventh cases (case 1 to case 7), at least one of light emission surfaces and light introduction surfaces of the lenses may have different curvatures. In the luminous flux ratio S/H, "S" denotes street side luminous flux and "H" denotes house side luminous flux.

Referring to FIG. 13, it will be appreciated that the lighting apparatus exhibits different street side luminous flux and house side luminous flux when a ratio RF1/RB1 of the first distance RF1 to the second distance RB1 with respect to the light introduction surface 322 of the lens 320 and a ratio RF2/RB2 of the first distance RF2 to the second distance RB2 with respect to the light emission surface 324 of the lens 320 are different.

It will be appreciated that, regardless of a shape of the lens 320, a ratio of street side luminous flux to house side luminous flux is 2 or more when a ratio RF1/RB1 of the first distance RF1 to the second distance RB1 with respect to the light introduction surface 322 of the lens 320 is less than 1 and a ratio RF2/RB2 of the first distance RF2 to the second distance RB2 with respect to the light emission surface 324 of the lens 320 is greater than 1 to less than 2.2.

The lighting apparatus 200 according to the embodiment may achieve a ratio S/H of street side luminous flux to house side luminous flux of 2 or more by regulating a ratio RF1/RB1 of the first distance RF1 to the second distance RB1 with respect to the light introduction surface 322 of the lens 320 and a ratio RF2/RB2 of the first distance RF2 to the second distance RB2 with respect to the light emission surface 324 of the lens 320.

Figure 14:
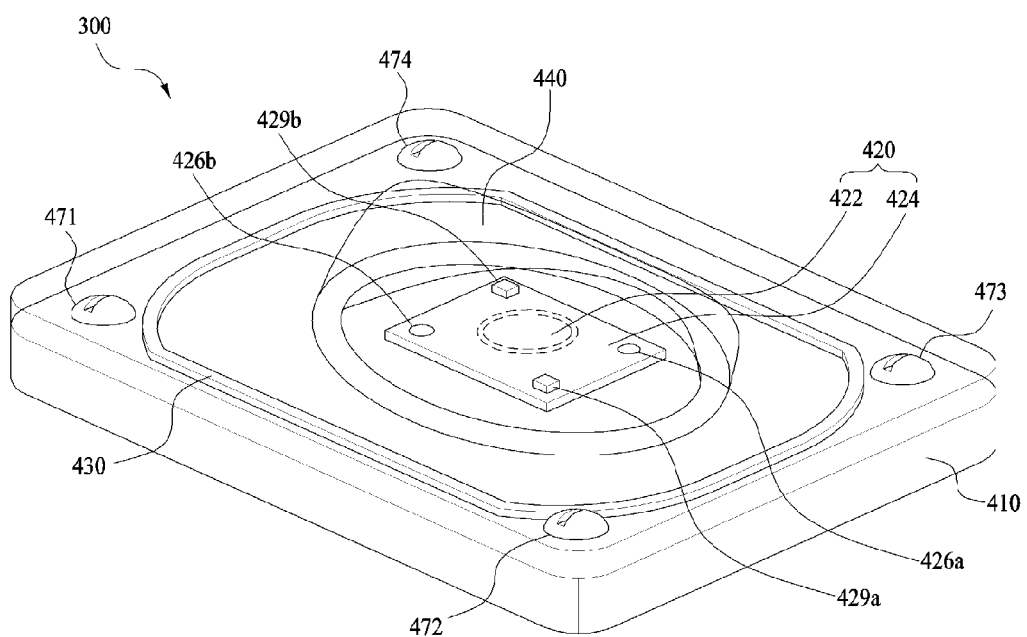
FIG. 14 is a perspective view of a lighting apparatus according to a further embodiment.
Figure 15:
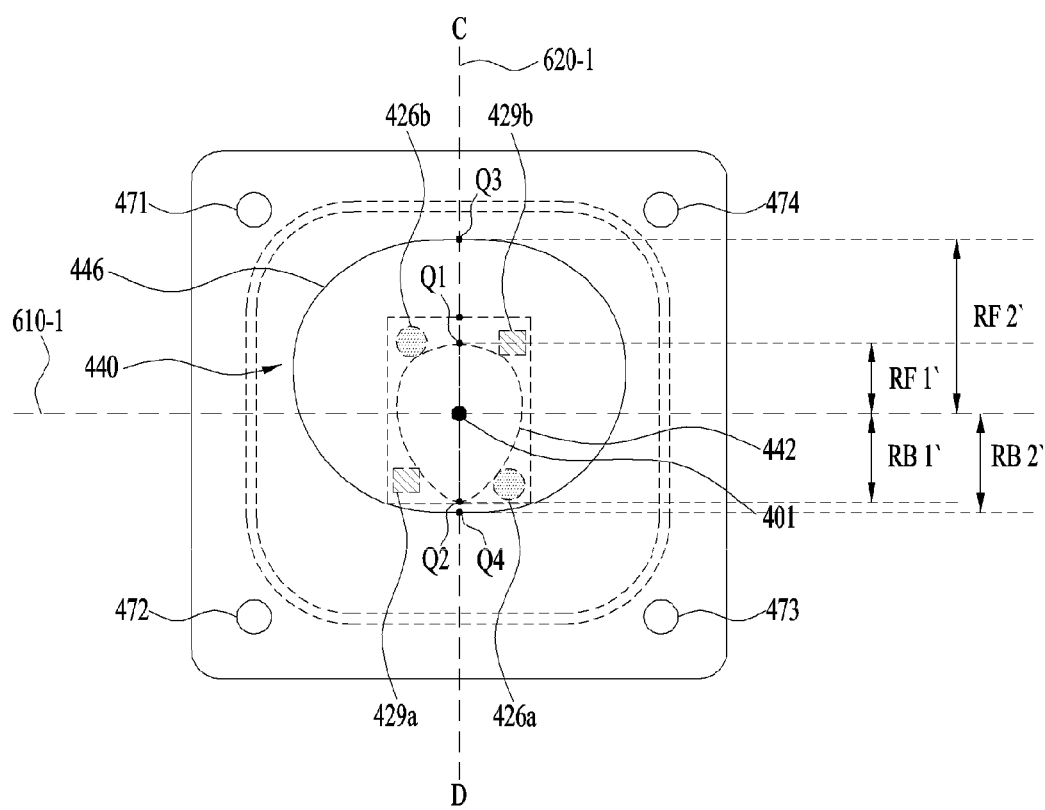
FIG. 15 is a plan view of the lighting apparatus shown in FIG. 14.

FIG. 14 is a perspective view of a lighting apparatus 300 according to a further embodiment, and FIG. 15 is a plan view of the lighting apparatus 300 shown in FIG. 14. The lighting apparatus 300 includes a body 410, a light source unit 420, a waterproof member 430, a lens 440, and at least one fastening member (e.g., 471 to 474).

The body 410 is configured to support the light source unit 420 and the lens 440. For example, the body 410 may be formed of a material having good electric insulation or thermal conductivity, such as a silicon based wafer level package, silicon board, silicon carbide (SiC) board, or aluminum nitride (AlN) board, or may be formed of a resin material, such as polyphthalamide (PPA). In addition, the body 410 may be a stack of multiple boards.

The body 410 may be provided at an upper surface thereof with at least one fastening recess (not shown). For example, a plurality of fastening recesses may be formed and each fastening recess (not shown) may be in proximity to a corresponding one of corners of the upper surface of the body 410. In addition, the body 410 may be provided at the upper surface thereof with an insertion groove (not shown) into which the waterproof member 430 may be inserted. The insertion groove may take the form of a closed loop, such as a circular loop or an oval loop, formed in the upper surface of the body 410 to surround the periphery of the light source unit 420.

The light source unit 420 is disposed on the body 410 to generate light. The light source unit 420 may include a board 424, a light emitting element 422, one or more fastening pieces 426a and 426b, a first electrode 429a, and a second electrode 429b. For example, the board 424 may be a printed circuit board, without being limited thereto.

The first electrode 429a and the second electrode 429b are disposed on the board 424 and electrically separated from each other. First power (e.g., positive power) may be supplied to the first electrode 429a and second power (e.g., negative power) may be supplied to the second electrode 429b. The board 424 may have a circuit pattern to electrically connect the first electrode 429a and the second electrode 429b to each other.

For example, the light emitting element 422 may be an LED, and the number of the light emitting element 422 may be 1 or more. The light emitting element 422 may be electrically connected to the first electrode 429a and the second electrode 429b.

The fastening pieces 426a and 426b couple the board 424 to the upper surface of the body 410. For example, the fastening pieces 426a and 426b may be screws, without being limited thereto.

The waterproof member 430 may be inserted into the insertion groove formed in the upper surface of the body 410 and may take the form of a ring, without being limited thereto. The waterproof member 430 may be located between the upper surface of the body 410 and the lens 440 and prevent invasion of moisture by improving contact between the lens 440 and the body 410. In addition, the waterproof member 430 may absorb pressure or friction shock between the lens 440 and the body 410. The waterproof member 430 may be formed of rubber, without being limited thereto.

The lens 440 is disposed on the body 410 to refract light generated from the light source unit 420. The lens 440 may be formed of a light transmitting resin material or glass material.

Figure 16:
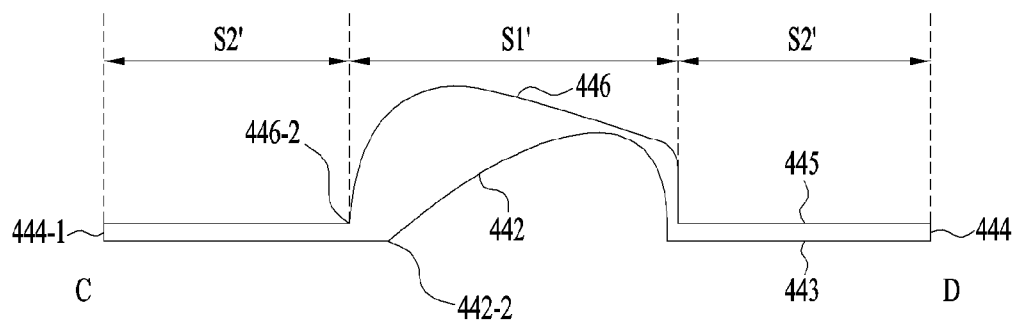
FIG. 16 is a sectional view of the lens taken along line C-D of FIG. 15.

FIG. 16 is a sectional view of the lens 440 taken along line C-D of FIG. 15. The lens 440 may be divided into a first region S1' that is a center region for light refraction and a flat second region S2' located around the first region S1' to come into contact with an edge of the first region S1'.

The lens 440 may include a light introduction surface 442 located at the first region S1', into which light is introduced, and a light emission surface 446 through which light having passed through the light introduction surface 442 is emitted outward. In addition, the lens 440 may include a lower surface 443, an upper surface 445, and a side surface 444, which are located at the second region S2'.

The lower surface 443 of the lens 440 may be oriented to face the upper surface of the body 410 and located around the light introduction surface 442. The lower surface 443 of the lens 440 may come into contact at one end thereof with the light introduction surface 442. For example, the light introduction surface 442 may come into contact with an inner circumference of the lower surface 443 of the lens 440.

The other end of the lower surface 443 of the lens 440 may come into contact with the side surface 444 of the lens 440. For example, an outer circumference of the lower surface 443 of the lens 440 may come into contact with the side surface 444 of the lens 440. The lower surface 443 of the lens 440 may be flat, without being limited thereto.

The upper surface 445 of the lens 440 may be located around the light emission surface 446 and come into contact with a lower end of the light emission surface 446. The upper surface 445 of the lens 440 may be flat, without being limited thereto. The side surface 444 of the lens 440 may be located between the upper surface 445 and the lower surface 443 of the lens 440. For example, the side surface 444 of the lens 440 may be perpendicular to at least one of the upper surface 445 or the lower surface 443 of the lens 440, or may be tilted by a given angle. The side surface 444 of the lens 440 may include faces facing different directions.

The light introduction surface 442 of the lens 440 may be oriented to face the light source unit 420 and may be a convexly curved surface into which light is introduced. A space may be defined between the light source unit 420 and the light introduction surface 442 of the lens 440. The space may be filled with air or be vacuum.

The light emission surface 446 of the lens 440 may be located above the light introduction surface 442 of the lens 440. The light introduction surface 442 of the lens 440 may be a convexly curved surface, by which light having passed through the light introduction surface 442 of the lens 440 is refracted to thereby be emitted outward.

The light emission surface 446 of the lens 440 may take the form of a convex dome, and the light emission surface 446 of the lens 440 and the light introduction surface 442 of the lens 440 may have different curvatures.

For example, the lens 440 may be identical to the lens 130 according to the above-described embodiment of FIG. 5, and a shape of the lens 440 may be determined, as described above with reference to FIG. 5, by an introduction angle of light to the light introduction surface 442 of the lens 440 and an emission surface of light emitted from the light emission surface 446 of the lens 440.

In addition, the lens 440 according to another embodiment may be identical to the lens 320 according to the above-described embodiment of FIG. 10, and a shape of the lens 440 may be determined, as described above with reference to FIG. 10, by a ratio of a first distance to a second distance with respect to the light introduction surface 442 of the lens 440 and a ratio of a first distance to a second distance with respect to the light emission surface 446 of the lens 440.

The light source unit 420 may be located at the center of the lens 440, although the embodiment is not limited thereto. For example, the center of a light emitting surface of the light source unit 420 may be aligned with the center of the lens 440. Light emitted from the light source unit 420 may be refracted according to curvatures of the light introduction surface 442 and the light emission surface 446 of the lens 440 when passing through the light introduction surface 442 and the light emission surface 446.

For example, the lens 440 may be asymmetrical on the basis of a first reference plane 610-1 and symmetrical on the basis of a second reference plane 620-1. The first reference plane 610-1 may be perpendicular to the lower surface 443 of the lens 440, pass through the center 401 of the light source unit 420 and be parallel to any one face 444-1 (see FIG. 16) of the side surface 444 of the lens 440.

For example, the first reference plane 610-1 may pass the center of the light emitting surface of the light source unit 420 and be parallel to any one face 444-1 (see FIG. 16) of the side surface 444 of the lens 440. The second reference plane 620-1 may pass the center 401 of the light source unit 420 and be perpendicular to the first reference plane 610-1.

A size of the light source unit 420 may be equal to or less than a size of the light introduction surface 442 of the lens 440. For example, a diameter of the light source unit 420 may be equal to or less than a diameter of the lower end of the light introduction surface 442.

For example, the maximum diameter of a light emitting area of the light source unit 420 may be equal to or less than the minimum diameter of the lower end of the light introduction surface 442 of the lens 440, without being limited thereto.

The lens 440 may have at least one through-hole (not shown) that corresponds to or is aligned with at least one fastening recess formed in the upper surface of the body 410. The at least one fastening member (e.g., 471 to 474) may pass through the at least one through-hole to thereby be fastened into at least one fastening recess. The fastening member (e.g., 471 to 474) may be a bolt or screw, without being limited thereto. That is, the lens 440 may be coupled to or separated from the body 410.

A ratio RF1'/RB1' of a first distance RF1' to a second distance RB1' with respect to the light introduction surface 442 may be less than 1.

The first distance RF1' with respect to the light introduction surface 442 may be a distance between the first reference plane 610-1 and the lower end of the light introduction surface 442 located at one side of the first reference plane 610-1 or at a street side.

The second distance RB1' with respect to the light introduction surface 442 may be a distance between the first reference plane 610-1 and the lower end of the light introduction surface 442 located at the other side of the first reference plane 610-1 or at a house side.

Here, the lower end of the light introduction surface 442 may be a lowermost end 442-2 of the light introduction surface 442. Alternatively, the lower end of the light introduction surface 442 may be a boundary between the light introduction surface 442 and the lower surface 443.

For example, the first distance RF1' with respect to the light introduction surface 442 may be a distance between the first reference plane 610-1 and a first point Q1 of the lower end of the light introduction surface 442 located at one side of the first reference plane 610-1 or at a street side. The first point Q1 may be one point of the lowermost end 442-2 of the light introduction surface 442 that is located at one side of the first reference plane 610-1 or at a street side and meets the second reference plane 620-1.

For example, the second distance RB1' with respect to the light introduction surface 442 may be a distance between the first reference plane 610-1 and a second point Q2 of the lower end of the light introduction surface 442 located at the other side of the first reference plane 610-1 or at a house side. The second point Q2 may be one point of the lowermost end 442-2 of the light introduction surface 442 that is located at the other side of the first reference plane 610-1 or at a house side and meets the second reference plane 620-1.

A ratio RF2'/RB2' of the first distance RF2' to the second distance RB2' with respect to the light emission surface 446 may be greater than 1 to less than 2.2

The first distance RF2' with respect to the light emission surface 446 may be a distance between the first reference plane 610-1 and one end of the light emission surface 446 located at one side of the first reference plane 610-1 or at a street side.

The second distance RB2' with respect to the light emission surface 446 may be a distance between the first reference plane 610-1 and the other end of the light emission surface 446 located at the other side of the first reference plane 610-1 or at a house side.

Here, one end of the light emission surface 446 may be a lowermost end 446-2 of the light emission surface 446. For example, one end of the light emission surface 446 may be a boundary between the light emission surface 446 and the upper surface 445.

For example, the first distance RF2' with respect to the light emission surface 446 may be a distance between the first reference plane 610-1 and a first point Q3 of one end of the light emission surface 446 located at one side of the first reference plane 610-1 or at a street side. The first point Q3 may be one point of the lowermost end 446-2 of the light emission surface 446 that is located at one side of the first reference plane 610-1 or at a street side and meets the second reference plane 620-1.

For example, the second distance RB2' with respect to the light emission surface 446 may be a distance between the first reference plane 610-1 and a second point Q4 of the other end of the light emission surface 446 located at the other side of the first reference plane 610-1 or at a house side. The second point Q4 may be one point of the lowermost end 446-2 of the light emission surface 446 that is located at the other side of the first reference plane 610-1 or at a house side and meets the second reference plane 620-1.

The lighting apparatus 300 according to the embodiment may have a ratio S/H of street side luminous flux to house side luminous flux of 2 or more as described above with reference to FIG. 13 because a ratio RF1'/RB1' of the first distance RF1' to the second distance RB1' with respect to the light introduction surface 442 of the lens 440 is less than 1 and a ratio RF2'/RB2' of the first distance RF2' to the second distance RB2' with respect to the light emission surface 442 of the lens 440 is greater than 1 to less than 2.2.

As is apparent from the above description, the embodiment may achieve at least second type light distribution pattern having directivity toward a street side and a ratio of street side luminous flux to house side luminous flux of 2 or more.

It will be understood that, when an element such as a layer (film), region, pattern, or structure is referred to as being "on" or "under" another element, it can be "directly" on or under another element or can be "indirectly" formed such that an intervening element may also be present. In addition, it will be understood that criteria of on or under is on the basis of the drawing.

Embodiments provide lenses that may achieve at least second type light distribution pattern having directivity toward a street side and may have a ratio of street side luminous flux to house side luminous flux of 2 or more and a lighting apparatuses including the lenses.

In one embodiment, a lens includes a light introduction portion having a light introduction surface for introduction of light and a light emission portion having a light emission surface for passage of light having passed through the light introduction portion, wherein the light introduction surface of the light introduction portion and the light emission surface of the light emission portion are configured to satisfy Equation 1 as represented by $\cos a1 - \cos \theta1 / \cos a2 - \cos \theta2 < 0$ (where, $\theta1$ is a first introduction angle of light introduced into one region of the light introduction portion located at one side of a reference plane, $\theta2$ is a second introduction angle of light introduced into the other region of the light introduction portion located at the other side of the reference plane, $a1$ is an emission angle of light, having the first introduction angle, emitted from the light emission surface, and $a2$ is an emission angle of light, having the second introduction angle, emitted from the light emission surface), and wherein the reference plane passes through a center of the lens and the lens is asymmetrical on the basis of the reference plane.

The first and second introduction angles and the first and second emission angles may be introduction angles and emission angles of light having a luminous intensity corresponding to 80% of the maximum luminous intensity of a light source unit.

The lens may be symmetrical on the basis of a plane perpendicular to the reference plane.

The lens may be asymmetrical on the basis of the reference plane.

The lens may further include a lower surface portion located around the light introduction portion, an upper surface portion located around the light emission portion, and a side surface portion located between the upper surface portion and the lower surface portion.

$\cos a1 - \cos \theta1$ may be a positive value and $\cos a2 - \cos \theta2$ may be a negative value.

Cos a1−cos θ1 may be a negative value and cos a2−cos θ2 may be a positive value.

In another embodiment, a lens includes a light introduction surface for introduction of light and a light emission surface for passage of light having passed through the light introduction surface, wherein a ratio of a first distance to a second distance with respect to the light introduction surface is less than 1 and a ratio of a first distance to a second distance with respect to the light emission surface is greater than 1 to less than 2.2, wherein the first distance with respect to the light introduction surface is a distance between a first reference plane and a lowermost end of the light introduction surface located at one side of the first reference plane and the second distance with respect to the light introduction surface is a distance between the first reference plane and the lowermost end of the light introduction surface located at the other side of the first reference plane, wherein the first distance with respect to the light emission surface is a distance between the first reference plane and the lowermost end of the light emission surface located at one side of the first reference plane and the second distance with respect to the light emission surface is a distance between the first reference plane and the lowermost end of the light emission surface located at the other side of the first reference plane, and wherein the first reference plane passes through a center of the light introduction surface.

The first distance with respect to the light introduction surface may be a distance between the first reference plane and a first point of the light introduction surface, the first point meeting a second reference plane, and the second distance with respect to the light introduction surface may be a distance between the first reference plane and a second point of the light introduction surface, the second point meeting the second reference plane, the first distance with respect to the light emission surface may be a distance between the first reference plane and a first point of the light emission surface, the first point meeting the second reference plane, and the second distance with respect to the light emission surface may be a distance between the first reference plane and a second point of the light emission surface, the second point meeting the second reference plane, and the second reference plane may pass through the center of the light introduction surface and be perpendicular to the first reference plane.

The lens may be asymmetrical on the basis of the first reference plane. The lens may be symmetrical on the basis of the second reference plane.

The light emission surface may have a recess located on the first reference plane.

The light introduction surface and the light emission surface may have different curvatures.

The lens may further include an upper surface located around the light emission surface to come into contact with a lower end of the light emission surface, a lower surface located around the light introduction surface to come into contact with a lower end of the light introduction surface, and a side surface located between the upper surface and the lower surface.

The lens may be formed of a light transmitting resin material or glass material.

The first reference plane may pass a center of a lower end of the light introduction surface.

The light introduction surface and the light emission surface may have different refraction angles.

In a further embodiment, a lighting apparatus includes a body, a light source unit disposed on the body to generate light, and the lens according to above embodiments, the lens may be disposed on the body.

The lighting apparatus may further include a waterproof member disposed between an upper surface of the body and the lens, and the body may be configured to support the light source unit and the lens.

The waterproof member may be located in an insertion groove formed in the upper surface of the body.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A lens comprising:
a light introduction surface for introduction of light; and
a light emission surface for passage of light having passed through the light introduction surface,
wherein a ratio of a first distance to a second distance with respect to the light introduction surface is less than 1 and a ratio of a first distance to a second distance with respect to the light emission surface is greater than 1 to less than 2.2,
wherein the first distance with respect to the light introduction surface is a distance between a first reference plane and a lowermost end of the light introduction surface located at one side of the first reference plane and the second distance with respect to the light introduction surface is a distance between the first reference plane and the lowermost end of the light introduction surface located at the other side of the first reference plane,
wherein the first distance with respect to the light emission surface is a distance between the first reference plane and a lowermost end of the light emission surface located at one side of the first reference plane and the second distance with respect to the light emission surface is a distance between the first reference plane and the lowermost end of the light emission surface located at the other side of the first reference plane,
wherein the first reference plane passes through a center of the light introduction surface,
wherein the light emission surface has a recess located on the first reference plane,
wherein the recess includes a first sidewall, a second sidewall, and a bottom edge that is a line at which the first and second sidewall connect, wherein a first length of the recess in a direction parallel with the first reference plane is longer than a second length of the recess in a direction perpendicular with the first reference plane, wherein the lens is asymmetrical on the basis of the first reference plane, wherein the bottom edge of the recess is aligned with the first reference plane, wherein each of the first sidewall and the second sidewall is spaced away from a lower end of the light emission surface, and wherein a length of the bottom edge in the direction parallel with the first reference plane is shorter than a diameter of the lowermost end of the light introduction surface.

2. The lens according to claim 1, wherein the first distance with respect to the light introduction surface is a distance between the first reference plane and a first point of the light introduction surface, the first point meeting a second reference plane, and the second distance with respect to the light introduction surface is a distance between the first reference plane and a second point of the light introduction surface, the second point meeting the second reference plane, wherein the first distance with respect to the light emission surface is a distance between the first reference plane and a first point of the light emission surface, the first point meeting the second reference plane, and the second distance with respect to the light emission surface is a distance between the first reference plane and a second point of the light emission surface, the second point meeting the second reference plane, and wherein the second reference plane passes through the center of the light introduction surface and is perpendicular to the first reference plane.

3. The lens according to claim 2, wherein the lens is symmetrical on the basis of the second reference plane.

4. The lens according to claim 1, wherein the light introduction surface and the light emission surface have different curvatures.

5. The lens according to claim 1, further comprising:
an upper surface located around the light emission surface and contacting with a lower end of the light emission surface;
a lower surface located around the light introduction surface and contacting with a lower end of the light introduction surface; and
a side surface located between the upper surface and the lower surface.

6. The lens according to claim 2, wherein the lens is formed of a light transmitting resin material or glass material.

7. The lens according to claim 1, wherein the first reference plane passes a center of a lower end of the light introduction surface.

8. The lens according to claim 2, wherein the light introduction surface and the light emission surface have different refraction angles.

9. A lighting apparatus having the lens of claim 1 comprising:
a body;
a light source provided on the body to generate light; and
the lens being provided on the body.

10. The lighting apparatus according to claim 9, further comprising a waterproof member provided between an upper surface of the body and the lens,
wherein the body is configured to support the light source and the lens.

11. The lighting apparatus according to claim 10, wherein the waterproof member is located in an insertion groove formed in the upper surface of the body.

12. The lens according to claim 1, wherein the recess is aligned with a center of a lower end of the light introduction surface.

13. The lens according to claim 1, wherein the light emission surface is a single continuous convex curve except for the recess.

14. The lens according to claim 1, wherein the first sidewall and the second sidewall of the recess are asymmetrical on the basis of the first reference plane such that a shape of the first sidewall is different from a shape of the second sidewall.

* * * * *